Patented Nov. 15, 1938

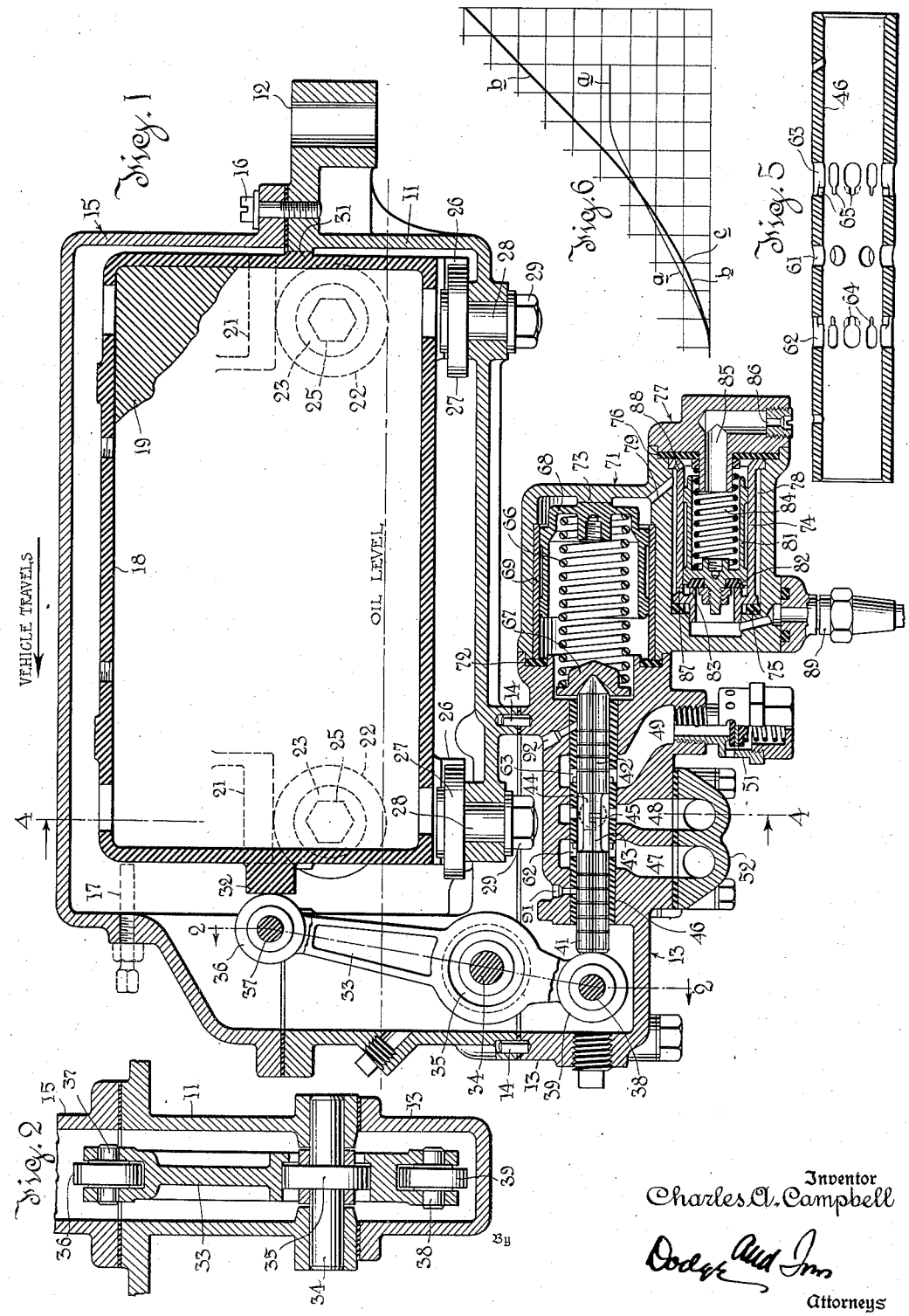

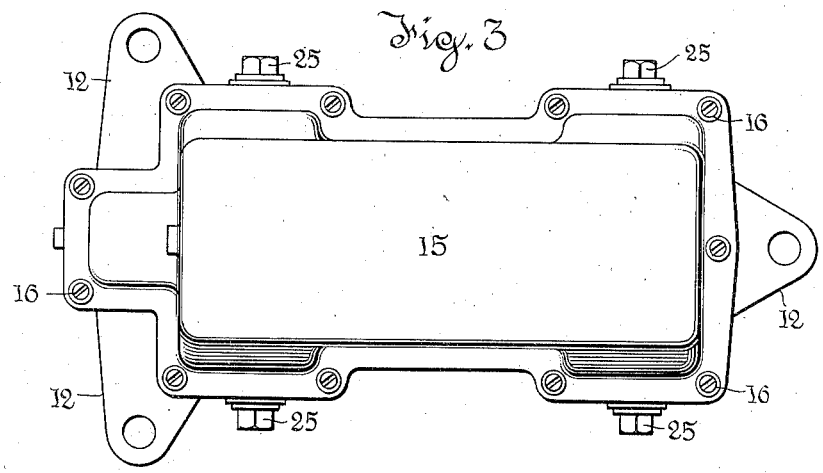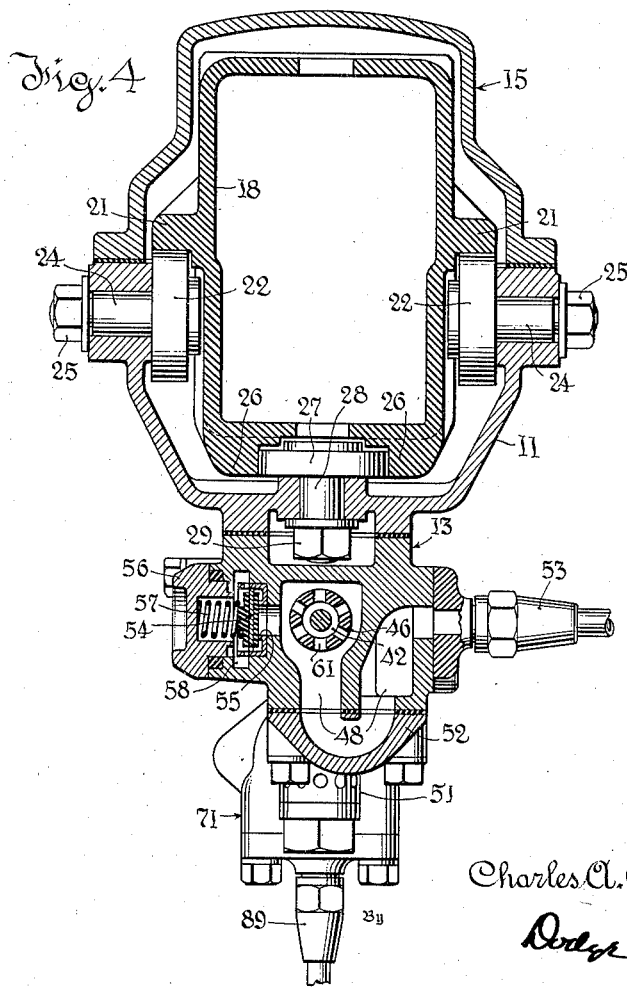

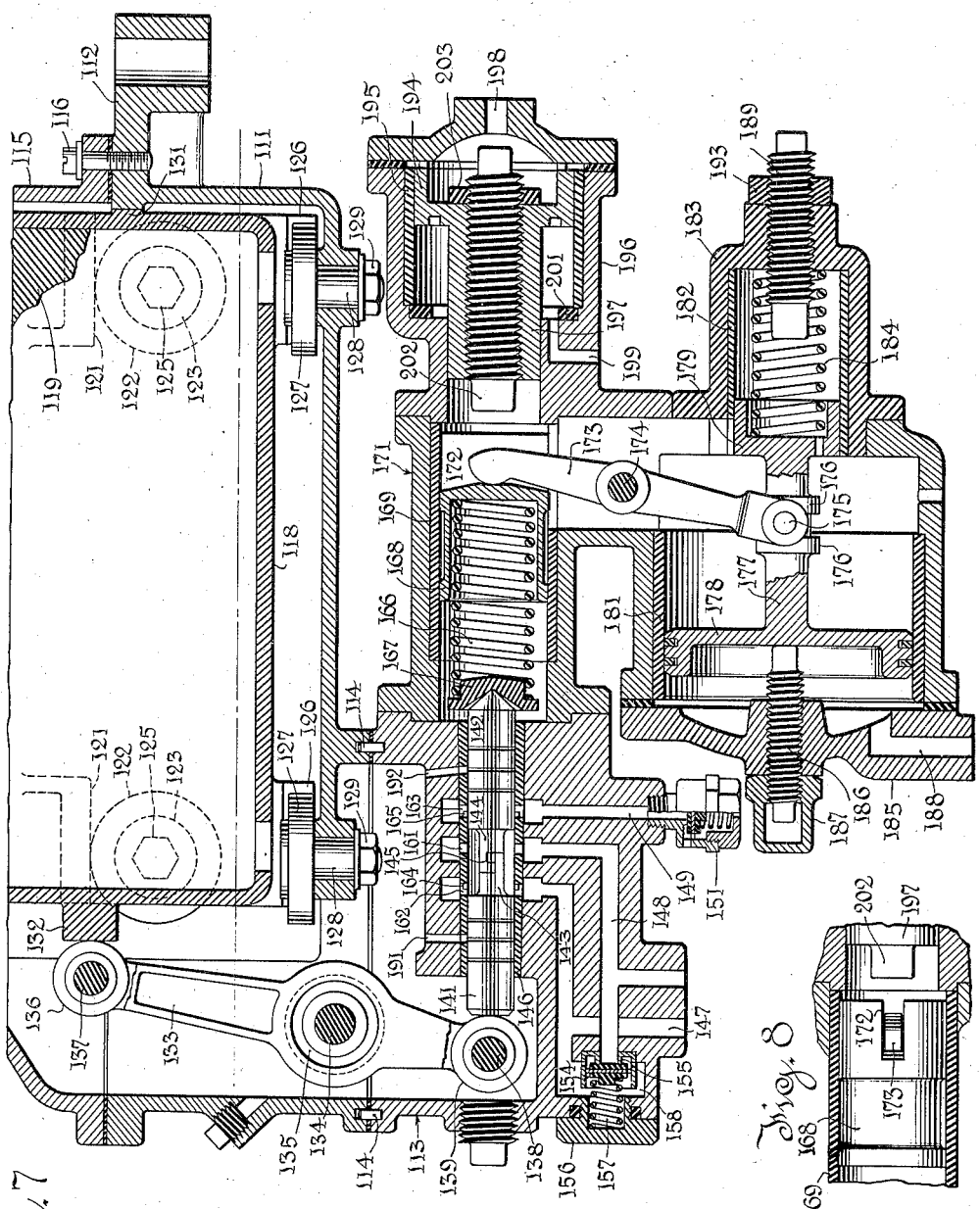

2,136,578

UNITED STATES PATENT OFFICE 2,136,578

FLUID PRESSURE BRAKE

Charles A. Campbell, Watertown, N. Y., assignor to The New York Air Brake Company, a corporation of New Jersey Application May 10, 1934, Serial No. 724,990

23 Claims. (Cl. 303—24)

This invention relates to fluid pressure brakes, and particularly to a modulating valve for varying the intensity of brake applications to ensure desired deceleration characteristics.

Generally stated, the modulating valve is of the supply and exhaust type and operates under the control of an inertia mass to admit and exhaust pressure fluid to and from the brakes.

While the device as here described and claimed is not limited to such use, I have interposed it successfully between an engineer's brake valve and a control chamber, the pressure in the control chamber operating through one or more relay valves to develop a related braking pressure. This and other systems including modulating valves responsive to deceleration are elsewhere described and claimed, and the present application is directed to mechanical and structural features of the modulating valve and the inertia device which actuates it.

Important features of novelty are the mode of supporting and guiding the inertia mass, the construction of the modulating valve, including its porting, the provision of means for establishing two or more deceleration rates and the provision of a single means for lubricating the moving parts and steadying their action.

The need for changing the deceleration rate arises from a variety of considerations, which are here stated to indicate the utility of certain features hereinafter disclosed.

The normal function of a deceleration controller is to maintain the maximum permissible deceleration rate. Such devices, in the absence of special rate changing means, will vary the intensity of brake application to maintain a uniform deceleration to a state of rest. The final stop is consequently harsh, and to avoid this it is desirable to reduce the deceleration rate in response to some quantity subject to variation as a state of rest is approached. The present application shows means for varying the rate controllable in response to such variable quantity.

Fluid pressure brakes are sometimes used in conjunction with supplemental brakes which are not susceptible of graduation in harmony with the fluid pressure, or are not susceptible of graduation at all, being either off or fully on. Where, in such a system, a deceleration controller is used to modulate the application of fluid pressure brakes, it must be set for an appropriate deceleration rate when the fluid pressure brakes alone act, but should be set for a higher deceleration rate when the supplemental brakes act in conjunction with the fluid pressure brakes, so as to secure the maximum braking effect then available. The present application shows, as a modified embodiment of the inventive concept, means for effecting such an adjustment in addition to the adjustment effective as a state of rest is approached.

Preferred embodiments of the invention will now be described by reference to the accompanying drawings, in which—

Fig. 1 is a vertical longitudinal axial section of a device having a single means for adjusting the decelerative rate.

Fig. 2 is a fragmentary transverse section on the line 2—2 of Fig. 1.

Fig. 3 is a plan view.

Fig. 4 is a transverse section on the line 4—4 of Fig. 1.

Fig. 5 is a longitudinal axial section of the valve seat bushing.

Fig. 6 is a plot, showing the relation of port area to valve displacement, for the special ports shown in Figs. 1 and 5, and also for circular ports.

Fig. 7 is a view similar to Fig. 1, showing a modified device including two adjusting means.

Fig. 8 is a fragmentary plan view, partly in section, showing the adjustable spring follower and portions of the two adjusting means therefor.

Figs. 1 to 5 are scale drawings of an actual commercial embodiment. To permit ports 147, 148 and 149 to be traced in a single view, the arrangement of these ports is diagrammatic in Fig. 7. In actual practice ports 147, 148 and 149 and valve 154 would be located as are ports 47, 48 and 49 and valve 54 in Figs. 1 to 5. The two arrangements are functionally identical.

Referring first to Figs. 1 to 4 inclusive, the device is supported and enclosed by a housing made up of three parts, a base section 11 having supporting lugs 12, a lower section 13 bolted thereto and held in alinement therewith by dowel pins 14, and a cap 15 attached to the main section by machine screws 16. Suitable gaskets are interposed between the sections as shown. The cap section 15 is provided with a threaded opening to receive a stop screw 17 which is used only during shipment of the device to hold the inertia mass against movement. When the device is in use, the stop screw 17, which is indicated in dotted lines in Fig. 1, is removed, and the hole which received it serves as a vent.

The portions 11 and 12 enclose a chamber in which is mounted the inertia mass consisting of a hollow cast metal shell 18 in which a solid core 19 of lead is cast. In Figs. 1, 4, and also in Fig. 7, hereinafter referred to, only a portion of the lead core is illustrated in order to avoid extensive cross hatching which would obscure the drawing, but it will be understood that the shell 18 is completely filled with lead. The total weight of the shell 18 with its lead core, is sufficient to operate the modulating valve mechanism hereinafter described and in one commercial embodiment which has demonstrated successful operative characteristics, approximates a weight of 100 pounds.

The shell 18 is provided on each side with two alined flanges 21 which are hardened and highly finished on their lower faces so as to offer the minimum rolling friction with ball bearing supporting rollers. These supporting rollers conveniently take the form of annular ball bearings in which the roller element 22 is the outer race of an annular ball bearing, whose inner race, indicated at 23 in Fig. 1, is supported on a bolt 24 passing through a boss formed in the member 11 and secured by means of a nut 25. This construction provides at minimum expense, a highly desirable form of ball bearing roller.

To center the shell 18 and preclude the existence of any side thrust on the rollers 22, the shell 18 is provided on its lower face with two alined sets of spaced flanges 26 whose opposed parallel faces are hardened and finished, as are the lower faces of the flanges 21. The opposed faces of the flanges 26 are spaced from each other a distance which very slightly exceeds the diameter of the rollers 27, which are, like the rollers 22, the outer races of annular ball bearings, the inner races of which are supported in bosses formed in the lower portion of member 11 by means of bolts 28 with nuts 29. The rollers 27 merely maintain the alinement of the shell 18 and are engaged on one or the other side by the flanges 26 if the shell 18 departs from its normal or central position.

The device is mounted on the vehicle whose deceleration is to be controlled, in such a way that the path of travel of the inertia mass as defined by the rollers 22 and 27 coincides with the path of travel of the vehicle, the vehicle being assumed to move in the direction indicated by the arrow on Fig. 1. The directions "forward" and "rearward" hereinafter used in this description, refer to the direction of travel of the vehicle as so indicated. The rear or normal position of the inertia mass is defined by a boss 31 on the rear end of shell 18 which engages a portion of the member 11. At its forward end the shell 18 is provided with a boss 32 which reacts against a lever 33.

The lever 33 is mounted on a cross pin 34 pressed into bosses formed in the member 12 (see Fig. 2) and an annular ball bearing structure, indicated generally at 35, is interposed between the pin 34 and the lever. The boss 32 does not react directly against the lever 33 but against the outer race of an annular ball bearing 36 whose inner race is mounted on pin 37 pressed through the forked upper end of the lever 33 (see Fig. 2). Similarly the lower end of the lever 33 is forked and carries on the pin 38 pressed therein, an annular ball bearing whose outer race 39 serves as a roller engaging the exposed forward end of the modulating valve.

This modulating valve, as best shown in Fig. 1, is made in two parts, a forward head 41 and a rear head 42 connected with one another by reduced portions 43 and 44 which engage each other by means of a stepped joint 45. The two heads 41 and 42 work in a tubular valve seat bushing 46, shown in detail in Fig. 5, and the provision of the joint 45 permits the heads 41 and 42 to aline themselves, and thus conduces to the free action of the valve as a whole. The bushing 46 is pressed to place in the member 13, and while it is possible to construct the valve in a single piece, such a construction makes it difficult to provide a valve in which both heads seal properly in the bushing and yet operate freely under all conditions.

The member 13 is provided with three cored passages, a supply passage 47, a passage 48 which is connected to the device to be controlled, and an exhaust passage 49 which leads to atmosphere through a back pressure valve 51. All three passages 47, 48 and 49, end in chambers which encircle the bushing 46, the chamber to which the passage 48 leads being indicated in section in Fig. 4. The others are similar.

The passages 47 and 48 are U-shaped, their end portions being in body 13 and their looped portions in a cap 52 (see Figs. 1 and 2) held by four cap screws located at the corners of a square. By removing cap 52, turning it 90° from the position illustrated, and replacing the cap screws, a direct connection between the end portions of passages 47 and 48 is established, and such connection is isolated from valve seat 46. In this way, the deceleration controller may be positively put out of action, and by-passed, in case of need. All pipe connections are made to the member 13, one such connection, namely that to the passage 48, being indicated at 53 in Fig. 4. A similar pipe connection (not shown) is made to passage 47.

As explained in the opening of the present specification, the modulating valve is commonly inserted between a manually operated engineer's brake valve and a control line, and in such case the engineer's brake valve is connected to the passage 47 and the control line is connected to the passage 48. Since, as hereinafter explained, the modulating valve at times isolates the passage 47 from the passage 48, it is obvious that it would be impossible to release the brakes under such conditions by moving the engineer's brake valve to release position. To permit such release a by-pass check valve is interposed in a communication between the passages 47 and 48 and functions to permit flow from the passage 48 to the passage 47 and prevent flow in the reverse direction. Thus supply flow from the brake valve to the control line is regulated by the modulating valve, while exhaust flow in the reverse direction is not controlled by the modulating valve. The by-pass check valve is best shown in Fig. 4. The valve proper is indicated at 54 and preferably is of the metal cored rubber type. It coacts with a seat 55 pressed into a recess in the member 13. Access to the valve is had by means of a removable cap 56 and the valve is held to its seat with moderate pressure by a coiled compression spring 57 which reacts between the cap and the valve. It will be understood that the space 58 at the back of the valve 54 is in communication with the passage 47 so that the valve 54 will open when pressure in passage 48 predominates over pressure in passage 47.

The valve seat bushing 46 is provided with three sets of ports. The middle set of ports 61, communicate with the control passage 48, and since these ports are never overtraveled by either of the heads 41, 42, their form is immaterial, and simple drilled ports are shown.

The supply ports 62 which communicate with the passage 47 and the exhaust ports 63 which communicate with the exhaust passage 49, are controlled by the inner ends of the heads 41 and 42. It will be observed that the heads 41 and 42 with their intermediate reduced connecting portion, form a balanced piston valve of the inside cut off type.

The port opening characteristics of the valve with respect to the ports 62 and 63 are important and these ports, as best shown in Fig. 5, are given special form by profiling operations.

Referring first to the supply port 62, as shown in Fig. 5, the port consists of an elongated slot with rounded ends and a narrow slot-like extension 64 rounded at its inner end. The ports 63 are similarly, but reversely, arranged, their slot-like extension 65 being also at the inner end. The reason for this special form of port can be best explained with reference to Fig. 6. On this figure abscissae represent displacement of the valve in an opening direction and ordinates represent area port opening. The curve a shows the relation of the valve displacement to port opening in the case of a circular or drilled port similar to the port 61. The curve b represents the port opening characteristic of ports formed as indicated with reference to ports 62 and 63, and the point c on the curve b indicates a condition when the extensions 64 or 65, as the case may be, are completely exposed and further displacement of the valve will start to open the main portion of the port. It will be observed that while the curve b does not give a straight line port opening characteristic, it approximates this condition above the point c while the portion of the curve below the point c is sufficiently uniform for all practical purposes.

The arrangement described permits the formation of satisfactory ports by profiling operation, using simple rose milling cutters.

The modulating valve made up of the connected heads 41, 42, is urged to the left by a coiled compression spring 66 which reacts against spring seat 67 engaged by the conical rear end of the head 42, as best shown in Fig. 1. The rear end of the spring 66 is sustained by cup-shaped piston 68 which is slidable in a cylinder bushing 69. The bushing 69 is supported in a body 71 bolted to the member 13 and sealed thereto by means of a gasket 72. The rearward position of the piston 68 is defined by a stop boss 73 and the limit of forward motion of the piston 68 is defined by its sealing engagement with the inner margin of the gasket 72.

When the piston 68 is in the right hand position, as shown, the stress on the spring 66 is low, and consequently the inertia mass, represented by the shell 18 with its lead filling, will respond to a relatively low rate of deceleration. When the piston 68 is subjected to sufficient pressure to shift it to its forward position, the inertia mass responds only to a much higher deceleration rate. In most cases it is desired to change the deceleration rate when a variable pressure, for example, the braking pressure, passes a critical value, and to accomplish this result, recourse is had to the use of a valve mechanism which shifts when pressure passes such critical value. Such a mechanism will now be described.

Mounted in a cavity in the body 71 is a bushing 74 which is sealed to the cavity at one end by a gasket 75 and sealed in the cavity at the other end by a gasket 76 which also serves to seal the joint between the body 71 and a closure cap 77. Between the gaskets 75 and 76 the bushing 74 is spaced from the walls of the cavity to afford an annular chamber 78 which is in communication with the space to the rear of piston 68 by way of passage 79. Slidable in the bushing 74 is a combined piston and poppet valve member 81, having at its inner end a valve disk 82 adapted to seal against an annular seat 83, substantially smaller than the end of the member 81. The member 81 is cup-shaped and is urged to the left by a coiled compression spring 84 which reacts between the member 81 and a cap 77 to force the member 81 into sealing engagement with the seat 83. An exhaust port 85 controlled by a removable choke 86 vents the space within the member 81 to atmosphere at a controlled rate. Leading through the bushing 74 adjacent its opposite ends are two ports 87 and 88.

The combined piston and valve member 81 is subjected on its inner or left hand end to the pressure in response to which the position of the piston 68 is to be changed. The connection for transmitting such pressure is indicated at 89. When the combined piston and valve 81 is in its inner left hand position, as shown, the space to the rear of piston 68 is vented to atmosphere by way of passage 79, port 88, passage 85 and choke 86, and the pressure arriving through the connection 89 acts only on the small area within the seat 83. As pressure rises to a point at which it starts to overpower the stress in the spring 84, the valve member 82 will move away from seat 83, exposing the entire area of the piston and valve member 81 so that this moves to its right hand limit of motion and seats against the gasket 76. In so doing it interrupts a connection between the port 88 and exhaust passage 85 and allows pressure fluid to flow from connection 89 through port 87, chamber 78 and passage 79, to the space to the rear of the piston 68. This piston then moves forward through its entire range of motion and seats on gasket 72, thus subjecting the spring 66 to the higher stress and seating the modulating valve to maintain a high rate of deceleration. As pressure in the connection 89 falls, a point will be reached at which the spring 84 will shift the piston and valve member 81 away from the gasket 76. This reestablishes the exhaust connection from passage 79 through port 88 to exhaust port 85, and at the same time establishes a vent connection by way of port 87, chamber 78 and port 88 to exhaust connection 85. The effect is to cause the combined piston and valve member 81 to move rapidly to the position shown in Fig. 1. Consequently, piston 68 moves to its rearward position and reestablishes the lower deceleration rate.

The parts 11 and 13 of the casting contain a bath of oil whose level is indicated by a legend on Fig. 1. This oil keeps the working parts lubricated. Ports 91 and 92 are provided to feed oil directly to the two valve heads 41 and 42.

The embodiment so far described provides for two deceleration rates, the higher of which would ordinarily be used throughout the major range of deceleration from the start of brake application, and the lower of which would be used as a state of rest is approached, in order to give a smoother stop.

In Figs. 7 and 8 a modified construction is shown, capable of giving three different rates of deceleration, the lower rate being used as a condition of rest is approached, and the two higher rates being used throughout the major portion of the stop, one being used when the auxiliary brakes are active, and the other being used when the pneumatic brakes operate alone. This changed operation involves merely a change in the means for loading the spring 66 of Fig. 1. Accordingly, in Fig. 7 parts corresponding to the parts 11 to 67 inclusive, 91 and 92 are numbered respectively as 111 to 167 inclusive, 191 and 192, and no further description of such parts is necessary.

As already stated, the ports 147 and 148 are diagrammatically shown in Fig. 7, so that it is impracticable to illustrate in Fig. 7 the use of a cap such as 52 of Fig. 1. It is to be understood, however, that the port arrangement of Fig. 1 including a cap such as 52 would be used with the structure of Fig. 7 in actual commercial practice. The by-pass check valve 154 is shown in the plane of section instead of the location shown in Fig. 1. This arises from the diagrammatic character of Fig. 7, and the location shown in Fig. 4 would be used with the structure of Fig. 7 in commercial practice.

The adjustable spring stop 168 (which is not a piston) works in a guide bushing 169 in the housing 171 bolted to the member 113. The spring seat 168 is provided with a transverse slot 172 at its rear end to receive the upper end of a lever 173 which is fulcrumed at 174 in the member 171. The lever 173 is forked at its lower end and there carries pins 175 which engage a slot between the collars 176 on the piston stem 177. This stem is formed integral with the piston 178 and a guiding head or pilot 179 which works respectively in a cylinder bushing 181 and a guide bushing 182, the bushing 181 being mounted in a portion of housing 171 and the bushing 182 being mounted in a cap 183 bolted to housing 171. A coiled compression spring 184 urges piston 178 to the left, that is toward a position establishing a minimum stress or loading on the spring 166. A removable cap 185 bolted to housing 171, encloses a working space to the left of piston 178 and carries a threaded stop 186 which limits the leftward motion of piston 178 and consequently the minimum stress setting of spring 166. A cap 187 threaded on the exposed end of stop 186 serves to lock this in position and prevent leakage of pressure fluid.

The connection 188 is a connection through which pressure fluid is admitted to react on the piston 178. If desired, a valve, responding to critical pressure, similar to that composed of the parts 74 to 88, might be used to control motion of piston 178, in which case port 188 would correspond to the port 79 of Fig. 1. It is deemed unnecessary to illustrate this valve mechanism because the possibility of its use will be apparent from the above statement. Its use is not strictly necessary in all cases. In fact, other means can be used to control the admission and exhaust of pressure fluid to and from the working space at the left of piston 178.

To limit the motion of piston 178 to the right, and, consequently, to limit the maximum stressing of spring 166 through the operation of piston 178, a second threaded adjustable stop 189 is used. This is mounted in a cap 133 and may be locked by a nut 193. To stress the spring 166 for a higher deceleration rate than the one effected by piston 178 in its furthest position to the right, use is made of a second motor whose piston 194 works in a cylinder bushing 195 carried by a housing 196, the housing being bolted to the housing 171. The piston 194 has a rod 197 which works in a guideway. The actuating pressure fluid is admitted to the port 198 from any suitable source, under the control of a suitable mechanism.

This mechanism might respond to the condition of the secondary brake system, i. e., it might respond to energize piston 194 if the secondary brake system be operative, and deenergize the piston if the secondary brake system be inoperative.

The space to the left of the piston 194 is vented to atmosphere at 199, except that when the piston 194 is at its left hand limit of motion, it seats on a gasket 201, preventing leakage past the piston to the exhaust port 199. Threaded in the stem 197 is an adjustable thrust member 202 locked in its adjusted positions by a check nut 203. The end of the member 202 straddles a slot 172 in the adjustable spring seat 168 so that when the piston 194 is forced to the left it moves the spring seat 168 to a position beyond that to which the piston 178 would move it. It will be observed that the end of the lever 173 does not fill the slot 172 so that the piston 194 may move without interfering with the lever 173 and the connected piston 178.

The operation of the device as above described will probably be readily understood from the description already given, but it may be recapitulated as follows:

Referring first to the embodiment shown in Figs. 1 to 4, when the train is in motion the parts will be in the position shown in Fig. 1. If a brake application is made the pressure to establish the application is fed through the passage 47 and thence through the ports 62 and 61 to the passage 48, and thus develops a brake applying pressure either directly or through the intermediary of relays, in a manner well understood in the art. If the resulting brake application is of sufficient intensity the inertia mass, represented by the parts 18 and 19, will move forward relatively to the vehicle, and shift the modulating valve 41, 42, to blank the port 62, 64 and connect the port 63, 65 with the port 61.

The effect is to gradually reduce the braking pressure. Generally stated, because the braking effect increases as the train slows down, the action of the modulating valve is to release the brakes gradually during the stop.

Under the conditions just stated, the pressure arriving through the connection 89, which may be connected to the control pipe or to the brake cylinder, for example, will be sufficient to cause the shifting of the member 81 to admit pressure fluid against the piston 68, causing this piston to shift forward and establish the maximum deceleration rate. As the train slows down and approaches a stop, the gradual reduction of brake cylinder pressure effected by the modulating valve, will reduce the pressure, holding the piston 81 to the right, so that ultimately piston 81 will shift to the left relieving the pressure on the piston 68 which then moves to the position shown in Fig. 1, establishing a low deceleration rate at the final portion of the stop.

The operation of the mechanism shown in Fig. 7 is similar. For example, the piston 178 might perform functions similar to the function of the piston 68. The piston 194 would be connected to a suitable apparatus which would cause it to move forward and establish the maximum permissible deceleration rate when some auxiliary brake mechanism, for example a track brake, is active, and to return to the position shown in Fig. 7 whenever such secondary braking means is inactive.

As stated, the present invention is not directed to the system, but is directed to the mechanical means for establishing various deceleration rates, such means being subject to control in various ways which are dependent on the particular system with which the mechanism is or may be used.

The special form of port described gives desirable flow control characteristics. The subdivision of the modulating valve member 141, 142, into two parts, insures free action, which is vitally essential if smooth graduation is to be secured.

The use of a bath of oil insures constant adequate lubrication and the oil exercises, to some degree, a stabilizing effect on the inertia mass, because the mass is partially submerged in oil.

While the two embodiments of the device have been described in considerable detail, these embodiments are intended to be illustrative, and the invention is not limited thereto, the scope of the invention being defined in the claims.

What is claimed is:

1. A deceleration controller for fluid pressure brakes, comprising in combination, a modulating valve including a ported seat and a valve element of the balanced piston type coacting with said seat to perform alternative admission and exhaust functions; an inertia mass guided to move substantially in a right line; a driving connection from said mass to said valve; and yielding means characterized by a resistance to displacement which increases with displacement, opposing movement of said valve by said mass, said yielding means, together with said mass, determining the functional position of said valve element relatively to said seat.

2. A deceleration controller for fluid pressure brakes, comprising in combination, a modulating valve including a ported seat and a valve element of the balanced piston type coacting with said seat to perform alternative admission and exhaust functions; an inertia mass guided to move substantially in a right line; a motion reducing driving connection from said mass to said valve; and yielding means characterized by a resistance to displacement which increases with displacement, opposing movement of said valve by said mass, said yielding means, together with said mass, determining the functional position of said valve element relatively to said seat.

3. A deceleration controller for fluid pressure brakes, comprising in combination, a cylindrical valve chamber open at its ends and having admission and exhaust ports, said chamber having means for connecting it with a device whose pressure is to be controlled; a piston valve of the inside cut off type working in said valve chamber closing the ends thereof and controlling said admission and exhaust ports; an inertia mass connected to shift said valve; and yielding means characterized by a resistance to displacement which increases with displacement, resisting shifting of said valve by said mass, said yielding means, together with said mass, determining the functional position of said valve relatively to the ports in said seat.

4. A deceleration controller for fluid pressure brakes, comprising in combination, a cylindrical valve chamber open at its ends, said chamber having means for connecting it with a device whose pressure is to be controlled, and having admission and exhaust ports; a piston valve of the inside cut-off type shiftable in said chamber to control said ports, the ends of said valve closing the ends of the chamber and being exposed thereat; an inertia mass guided in substantially a right line; motion transmitting means actuated by said mass and engaging an end of said valve to shift the same; and yielding means characterized by a resistance to displacement which increases with displacement, engaging an end of said valve and resisting motion imparted thereto by said motion transmitting means.

5. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; and yielding means characterized by a resistance to displacement which increases with displacement, acting in thrust against the other end of said valve.

6. A deceleration controller for fluid pressure brakes comprising in combination, a cylindrical valve chamber, open at its ends, said chamber having means for connecting it with a device whose pressure is to be controlled, and having admission and exhaust ports; a piston valve of the inside cut-off type shiftable in said chamber to control said ports, said valve closing the ends of said chamber and being exposed thereat; an inertia mass guided in a substantially straight line adjacent to and substantially parallel with the axis of said chamber; a motion transmitting lever reacting in thrust with said mass and with one end of said valve and having a motion reducing characteristic such that the travel of the mass is long relatively to the travel of the valve; and yielding means characterized by a resistance to displacement which increases with displacement, acting in thrust against the other end of said valve.

7. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; yielding means characterized by a resistance to displacement which increases with displacement, acting in thrust against the other end of said valve; and means for maintaining a lubricant bath about at least a portion of said mass and its guiding and motion transmitting connection, and for feeding lubricant to said valve.

8. A deceleration controller for fluid pressure brakes, comprising in combination, modulating valve means; an inertia mass for actuating said valve means; yielding means characterized by a resistance to displacement which increases with displacement, for resisting motion of said inertia mass; motor means for variably stressing said yielding means; and adjustable stop means for varying the range of motion of said motor means.

9. A deceleration controller for fluid pressure brakes, comprising in combination, modulating valve means; an inertia mass for actuating said valve means; yielding means characterized by a resistance to displacement which increases with displacement, for resisting motion of said inertia mass; motor means for variably stressing said yielding means; and two independently adjustable stops for limiting the motion of said motor means in opposite directions.

10. A deceleration controller for fluid pressure brakes, comprising in combination, modulating valve means; an inertia mass for actuating said valve means; yielding means characterized by a resistance to displacement which increases with displacement, for resisting motion of said inertia mass; and two independently operable motor means for variably stressing said yielding means.

11. A deceleration controller for fluid pressure brakes, comprising in combination, modulating valve means; an inertia mass for actuating said valve means; yielding means characterized by a resistance to displacement which increases with displacement, for resisting motion of said inertia mass; two independently operable motor means for variably stressing said yielding means; and adjustable stops for varying the range of motion of at least one of said motors.

12. A deceleration controller for fluid pressure brakes, comprising in combination, modulating valve means; an inertia mass for actuating said valve means; yielding means characterized by a resistance to displacement which increases with displacement, for resisting motion of said inertia mass; two independently operable motor means for variably stressing said yielding means; an adjustable stop for determining the stress on said yielding means when both said motors are inactive; and independently adjustable means for determining the additional stress imparted by the action of each of said motors.

13. A deceleration controller for fluid pressure brakes, comprising in combination, a modulating valve including a ported seat and a valve element of the balanced piston type coacting with said seat to perform alternative admission and exhaust functions; an inertia mass guided to move substantially in a right line; a driving connection from said mass to said valve; yielding means characterized by a resistance to displacement which increases with displacement, opposing movement of said valve by said mass, said yielding means, together with said mass, determining the functional position of said valve element relatively to said seat; and fluid pressure actuated means for variably stressing said yielding means.

14. A deceleration controller for fluid pressure brakes, comprising in combination, a modulating valve of the balanced piston type having alternative admission and exhaust functions; an inertia mass guided to move substantially in a right line; a driving connection from said mass to said valve; yielding means characterized by a resistance to displacement which increases with displacement, opposing movement of said valve by said mass; fluid pressure actuated means for variably stressing said yielding means; and valve means responsive to a definite pressure for controlling said fluid pressure actuated means.

15. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; yielding means characterized by a resistance to displacement which increases with displacement, acting in thrust against the other end of said valve; and fluid pressure actuating means for variably stressing said yielding means.

16. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; yielding means characterized by a resistance to displacement which increases with displacement, acting in thrust against the other end of said valve; fluid pressure actuated means for variably stressing said yielding means; and valve means responsive to a definite pressure for controlling said fluid pressure actuated means.

17. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; yielding means characterized by a resistance to displacement which increases with displacement, acting in thrust against the other end of said valve; and a plurality of independently operable fluid pressure actuated means for increasing the stress on said yielding means.

18. A deceleration controller for fluid pressure brakes, comprising in combination, a cylindrical valve chamber open at its ends, said chamber having means for connecting it with a device whose pressure is to be controlled and having admission and exhaust ports; a piston valve of the inside cut-off type shiftable in said chamber to control said ports, said valve closing the ends of said chamber and being exposed thereat; an inertia mass guided in substantially a straight line; a motion transmitting connection acting in thrust between said mass and one end of said valve; yielding means characterized by a resistance of displacement which increases with displacement, acting in thrust against the other end of said valve; a plurality of independently operable fluid pressure actuated means for increasing the stress on said yielding means; and adjustable means for limiting the stress increasing action of said fluid pressure actuated means.

19. A deceleration controller for fluid pressure brakes comprising in combination, a movable inertia mass; yielding means characterized by a resistance to displacement which increases with displacement, opposing motion thereof; and a balanced piston valve operable thereby, said piston valve comprising a hollow cylindrical seat member and two self-alining valve heads connected to move in unison in said seat member.

20. A deceleration controller for fluid pressure brakes comprising in combination, a movable inertia mass; a cylindrical valve chamber; two self-alining valve heads shiftable in unison in said chamber by said inertia mass, said heads being held in interlocking engagement with one another by the confining action of said chamber; and yielding means characterized by a resistance to displacement which increases with displacement, resisting motion imparted to said valve by said mass.

21. A deceleration controller for fluid pressure brakes comprising in combination, a movable inertia mass; a seat member having elongated admission and exhaust ports formed with rounded ends, said ports having narrow longitudinal extensions each formed with a rounded end, the extensions of the exhaust ports and admission ports being oppositely directed; a reciprocating valve actuated by said inertia mass and controlling said ports; and yielding means characterized by a resistance to displacement which increases with displacement, resisting motion of said mass.

22. A deceleration controller for fluid pressure brakes comprising in combination, a movable inertia mass; a reciprocating valve operable by said mass; a seat having elongated ports controlled by said valve, said ports being narrow at the end initially uncovered by the valve, then gradually widening, and then having a uniform width for the remainder of their length exposed by the valve; and yielding means characterized by a resistance to displacement which increases with displacement, resisting motion of the valve under the urge of said mass.

23. A deceleration controller for fluid pressure brakes comprising in combination, a modulating valve having alternative admission and exhaust functions; an inertia mass connected to actuate said valve; yielding means characterized by a resistance to displacement which increases with displacement, opposing movement of said valve by said mass; pipe connections for connecting said controller with a source of pressure fluid and with a control line; and a removable member adapted to be mounted on said controller in two alternative positions, in one of which it interposes said valve between said connections, and in the other of which it establishes a direct connection between said connections and isolates them from said valve.

CHARLES A. CAMPBELL.